Figure 1:
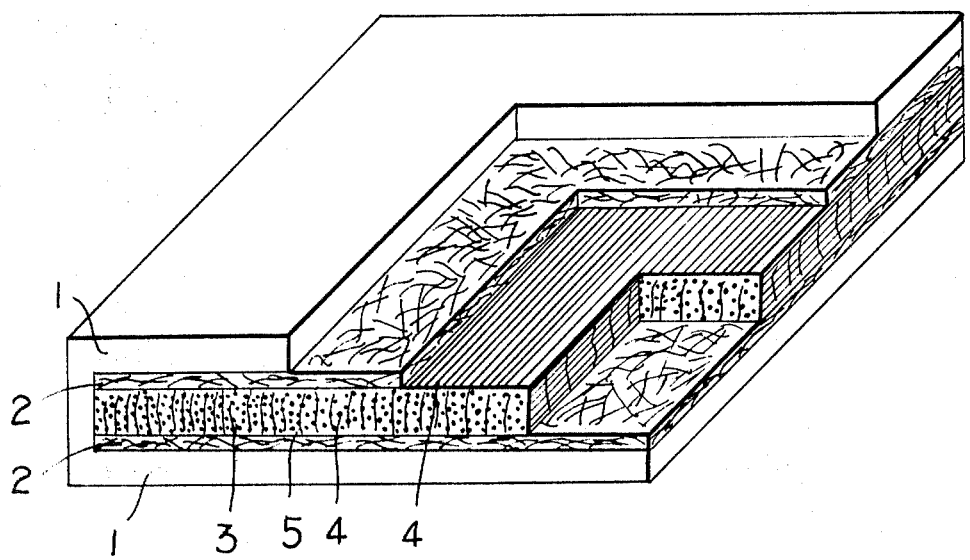

United States Patent

[11] 3,616,164

[72] Inventors Katsukiyo Tanimoto;
Tamio Urakawa; Sotaro Itadani, all of Kurashiki, Japan
[21] Appl. No. 794,248
[22] Filed Jan. 27, 1969
[45] Patented Oct. 26, 1971
[73] Assignee Kurashiki Rayon Co., Ltd.
Sazaku, Kurashiki, Okayama Prefecture, Japan
[32] Priorities Jan. 30, 1968
[33] Japan
[31] 43/5568;
June 27, 1968, Japan, No. 43/54547

[54] CONVEYOR BELT AND A PROCESS FOR THE MANUFACTURE THEREOF
13 Claims, 4 Drawing Figs.
[52] U.S. Cl. .................................................. 161/141,
74/232, 161/81, 161/85, 161/152, 161/154
[51] Int. Cl. ........................................................ B32b 3/18,
B32b 5/08
[50] Field of Search ........................................... 161/141
−144, 142, 81, 80, 85, 152, 154; 74/232

[56] References Cited
UNITED STATES PATENTS
| | | | |
|---|---|---|---|
| 2,633,227 | 3/1953 | Hutchins ...................... | 161/144 |
| 2,793,150 | 5/1957 | Deaves ......................... | 161/144 |
| 3,154,462 | 10/1964 | Smith ........................... | 161/154 |
| 3,401,467 | 9/1968 | Koester ......................... | 161/154 |

Primary Examiner—Morris Sussman
Attorney—Sherman and Shalloway

ABSTRACT: A conveyor belt in which the rubber cover is bonded with the core impregnated with an adhesive, characterized in that the core is a nonwoven sheet consisting of a filamentary layer of longitudinally paralleled synthetic filaments or chemical filaments and web layers of random or carded staple fibers which are superposed on the top and bottom of the filamentary layer, said filamentary layer being composed of substantially nontwisted and noncrimped filaments, and the web layers being composed of crimped staple fibers, that the filamentary layer and the web layers are superposed and integrated by needling, that the nonwoven sheet is sufficiently impregnated with an adhesive, that the weight ratio of the filamentary layer to the web layers ranges 5:1 to 1:1 and that the said adhesive is of rubber-type, and a process for the manufacture thereof.

CONVEYOR BELT AND A PROCESS FOR THE MANUFACTURE THEREOF

This invention relates to a conveyor belt and a process for the manufacture thereof. More particularly, the invention relates to a conveyor belt having a core body fabric and outer rubber covers on its top and bottom, said core fabric construction comprising a filamentary layer in which the filaments are paralleled in the longitudinal direction, web layers superposed on its top and bottom, the layers of filaments and webs together forming a needled sheet of nonwoven fabric, and the sheet serving as the core being sufficiently impregnated with an adhesive, and also to a process for the manufacture thereof.

It is known that conveyor belts are made in numerous ways and of various constructions. Among known conveyor belts, some employ multi-ply core bodies formed by laminating several sheets of plain woven fabrics. A conveyor belt of monopoly core, i.e. core of single woven fabric is impracticable, because it exhibits too great elongation and excessive pliability which means poor load carrying ability. Therefore, the elongation and pliability are suitably adjusted by combining several sheets of woven fabric in the known conveyor belts. On the other hand, in such multi-ply constructions, sufficiently strong bonding is required between the rubber cover and core bodies and flexibility of the belt is sacrificed to a certain extent. Such multi-ply conveyor belts are furthermore unsuitable for the use in the field where less longitudinal is required, since they have a relatively large elongation in said direction. Also the core body of such conveyor belt requires much labor in numbers of steps such as spinning, weaving, laminating several sheets of woven fabric and dipping of the core for imparting adherability thereto with the rubber cover. Such conveyor belts are formed through steps of friction of rubber, and pressing of the rubber cover on the core body. Thus their manufacturing procedures are time-consuming, and the products, expensive.

Conveyor belts using the core in which staple fiber are mixed into masticated rubber by roll blending are also known. However such belts are not only insufficient in strength, but also exhibit excessively high elongation and low tear strength, because of the limitations incurred on their manufacturing conditions that the staple fibers to be mixed with masticated rubber should not be any longer than 10 mm., and the amount thereof is at most 10—20 percent to the rubber. Also their joining ability to metallic tools at the ends is unsatisfactory, which is an indeed serious defect.

The main object of the invention is, therefore, to provide a novel, monoply conveyor belt having a sheet of nonwoven fabric consisting of a filamentary layer and web layers as the core.

Still another object of the invention is to provide a conveyor belt which exhibits sufficiently high strength and low elongation in the longitudinal direction.

A further object of the invention is to provide a novel process for manufacture of conveyor belts consisting of simpler steps compared with the conventional methods requiring many steps and much labor.

Other many objects and advantages of the invention will become apparent from the following descriptions.

Conveyor belts are used as a combination of rubber cover and a suitable core body selected according to the purpose of use. They are generally classified into low-, medium-, and high-strength conveyor belts. Required performances of the conventional low- and medium-strength conveyor belts using woven fabrics as the core are as follows:

1. That they exhibit high strength in the longitudinal direction of belt, such as 100–300 kg. per 1 cm. width of belt; the tension in use is approximately one-tenth to one-sixteenth of the strength. The elongation in that case is preferably no more than 2 percent.
2. That the adherability of the core with rubber cover is at least 7 kg. per 2.5 cm. width.
3. That the belts possess flexibility; they should be able to resist the flexing of 100,000 times in the later described flexing test (cf. examples).
4. That the two ends of the conveyor belt can be easily joined. (Normally lacing is used for this purpose). The bonding efficiency should be at least 30 percent to the strength in longitudinal direction.
5. That the belts possess impact strength.
6. That the belts exhibit little fatigue during use. That is, they should exhibit little alteration in core strength, and little aging in the adherability with rubber cover.
7. That the foregoing performances should show little deterioration under wet conditions.

The conveyor belts of the invention uses as the core single ply sheet of nonwoven fabric composed of synthetic, chemical fibrous layer of nontwisted and noncrimped filaments which are parallel in the longitudinal direction of the belt, and carded or random web layers of synthetic, chemical staple fibers which are superposed on the two surfaces (top and bottom) of the first filamentary layer. The filamentary layer and web layers are joined by needling, and sufficiently impregnated with an adhesive.

In the present specification and appended claims, "nonwoven sheet" is defined to designate the filamentary layer and the web layers joined by needling, and "core" means the nonwoven sheet impregnated with an adhesive.

Figure 2:
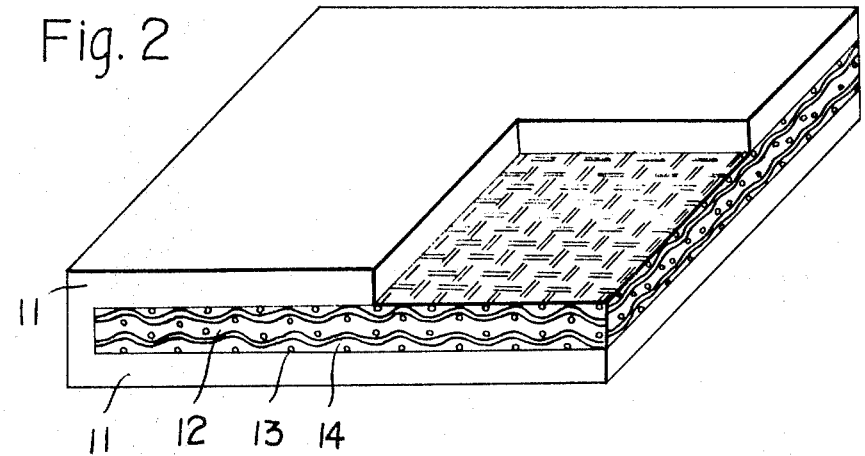
Figure 3:
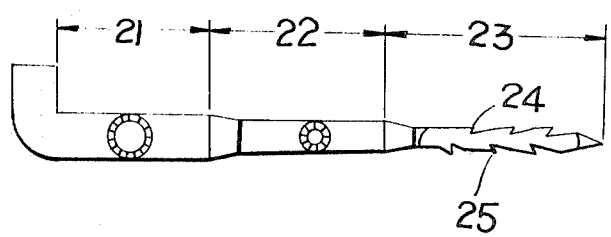
Figure 4:
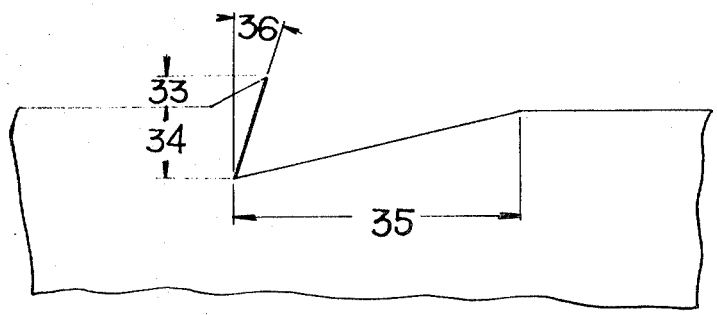

Among the attached drawings, FIG. 1 shows a fragmentary horizontal section of a conveyor belt of the invention. FIG. 2 shows a fragmentary horizontal section of a conventional conveyor belt. FIG. 3 shows a plan view of the needle employed for needling the filamentary layer and two web layers in accordance with the invention. And, FIG. 4 is an enlarged plan view of barb 25 of the needle.

Referring to FIG. 1, 1 denotes rubber cover, 2 denotes web layers, 3 is the filamentary layer, 4 denotes the filaments paralleled in the longitudinal direction, and 5 indicates the joined state of fibers after needling of the filamentary layer 3 and web layer 2. The rubber cover 1 and web layers 2 are adhered by pressing.

Referring to FIG. 2, 11 is the rubber cover, and 12 is the core body composed of woven fabric, 13 denoting woof and 14, warp. The core body 12 consists of multiple plies, i.e., several sheets of woven fabrics superposed one another, and is impregnated with an adhesive by dipping. The core 12 is furthermore bonded to the rubber cover 11 by pressing.

Referring now to FIG. 3, 21 is a shank, 22 is an intermediate blade, 23 is the blade and 24, barb: Referring to FIG. 4, 33 is keep-up height, 34 is the throat depth, 35 is the throat length, and 36 denotes undercut angle.

As the fiber material forming the filamentary layer and web layers in the conveyor belt of the invention, synthetic, chemical fibers from polyester, polyvinyl, polypropylene, polyamide and high tenacity rayon, etc. can be used.

The filamentary layer is formed of substantially nontwisted and noncrimped filaments. "Substantially nontwisted and noncrimped" means that the filaments have not been subjected to twisting or crimping step with the intention of imparting thereto, respectively, twist or crimp. Use of twisted or crimped filaments is undesirable, since such deteriorates the longitudinal strength and flexibility which are required of conveyor belts, and furthermore objectionably increases the elongation.

The objects of the invention can be sufficiently achieved with the use of such filaments of the size conventionally produced. The preferred size ranges 1.45–7 deniers.

Whereas, the web layers are formed of carded or random webs of crimped staple fibers, with the use of conventional apparatus for making nonwoven fabrics. The length of the staple fibers is not particularly critical, but those of at least 40 mm., preferably 40–120 mm. show improved intertwining property with the filamentary layer. The cut fibers of conventional size can be satisfactorily used, similarly to the case of filaments.

The weight ratio of filamentary layer to web layers is variable to a certain extent, depending on the type of material used. It normally ranges, however, from 1:1–5:1, preferably 2–3:1. When the weight ratio is less than 1/1, flexibility of the belt is impaired due to the excessive bulk of the web layers, and when it is more than 5/1, intertwining effect of needling is hampered to deteriorate flexibility of the product. The weight of the filamentary layer varies according to the intended strength and width of the conveyor belt. With the increase in weight of filamentary layer, thickness of the layer increases, showing a tendency of flexibility deterioration. Accordingly, it is desirable to keep the weight of filamentary layer to the allowable minimum depending on on the intended strength of conveyor belt. Such minimum weight is advantageous also from economical standpoint. It is normally no more than 900 g./m.$^2$, preferably no more than 800 g./m.$^2$. It can be understood that the weight of the webs can be readily determined from the aforesaid weight ratio and specific weight of the filamentary layer.

The total thickness of the core body depends on the weights of filamentary layer and two web layers, as well as on the pressure employed for pressing the rubber cover thereonto as the final step. In case of manufacturing medium- or low-strength belt in accordance with accepted practice, the thickness is normally no more than approximately 1.5 mm., preferably no more than 1.2 mm.

Needling is performed for the purpose of shape retention of the core body. Either one of web layers and the filamentary layer may be first needled and then superposed with the other web layer to be subjected to the second needling, or both of the web layers may be superposed on the top and bottom of filamentary layer to be needled only once. Obviously the needling can be given repeated number of times, so far as the layers to be needled are not damaged.

When an excessive needling is given to the filamentary layer alone, the filaments are cut and longitudinal strength and elongation of the belt are impaired. Also if the excessive needling is given to the web layers alone, intertwining of fibers is strengthened and the web becomes compact. Because of this, even when the filamentary layer is superposed on the web layer and needled together, it is difficult to obtain an intertwining effect, and the flexibility of the conveyor belt is deteriorated. The needling of filamentary layer alone, which may be referred to as preneedling, is sufficiently performed at a punching density of 15–200 times per square centimeter. Also the punching density of the needling of web layers alone is preferably no more than 30 times per square centimeter. Such preneedling is not always required. The preneedling of the filamentary layer is carried out for the purpose of removing spots caused by tension and of opening the filaments. Subsequently, a web must be superposed, and needling of them together should be carried out.

The punching density of needling given to the filamentary layer with the two web layers superposed on its top and bottom is 100–600 times per square centimeter, preferably 200–400 times per square centimeter. When the punching density is less than 100 times per square centimeter, the resulting conveyor belt shows a tendency of reduced flexibility, and when it is more than 600 times per square centimeter, the longitudinal strength of the conveyor belt tends to be reduced.

The punching density is also dependent, to a certain extent, on the size and configuration of the needle employed. The needle size normally ranges 0.5–1.3 mm., preferably 0.6–0.8 mm., in diameter, and the size is expressed by height of its cross section. The barb configuration may be triangular, round, or square, but triangular is preferably used. The undercut angle of the barb is 0–70°, preferably 10–30°, but angles outside the preferred range are usable so far as a sufficient intertwining property can be imparted to the filamentary layer and web layers. The preferred keep-up height of barb ranges 0.2–0.4 mm., but heights outside the specified range are usable so far as the layers are imparted with satisfactory intertwining property and fiber breakage is not aggravated. A standard number of the barb is 9.

The nonwoven sheet composed of a filamentary layer and two web layers, which is thus imparted with dimensional stability and intertwining property, is then impregnated with an adhesive.

The adhesive is employed in accordance with the theory of adhesive, i.e., it is preferred to use an adhesive containing a component having a high affinity to the rubber cover, particularly a component identical with the rubber cover. For example, combinations of natural rubber or styrene-butadiene combinations with natural rubber, styrene-butadiene, vinylpyridine rubber or latices thereof; nitrile-butadiene rubber with nitrile-butadiene rubber or its latex; chloroprene rubber with chloroprene rubber or its latex; isobutylene-isoprene rubber with isobutylene-isoprene rubber or its latex; are preferred. When the rubber cover consists of natural or styrene-butadiene rubber or a mixture thereof, as the adhesive any of natural, styrene-butadiene rubber, or vinylpyridine rubber or latices thereof is usable, at an optional blend ratio. When the rubber cover consists of more than one component in the above-mentioned combinations, it is preferred to use more than one component of the corresponding adhesive components. Vinylpyridine rubber-type adhesive is employed when particularly strong bonding is required between the rubber cover and core body. However, since conveyor belts are mostly made of natural or SBR rubber, in most occasions natural, SBR, or vinylpyridine rubber or latices thereof are used as the rubber component of adhesive.

The adhesive must be sufficiently infiltrating in the nonwoven sheet. The adhesive pickup by the infiltration is at least 20 wt. percent to the nonwoven sheet, preferably at least 25 wt. percent. When the pickup is less than 20 wt. percent, the longitudinal strength and flexibility of the belt are objectionably impaired.

The ideal state of distribution of the adhesive in the nonwoven sheet is such that the adhesive is cross-sectionally uniformly distributed, and every monofiber constituting the nonwoven sheet is sufficiently fixed. Upon fixing of monofibers, the core body is imparted with strength and flexibility.

In order to impart strong adhesion between the nonwoven sheet as core used and the cover rubber and between the filamentary layers and the staple fiber layers, the adhesive preferably consists of the rubber component and also a component having an affinity with the fibers (fiber-philic component), such as well known isocyanate compounds, resorcin-formalin resin, epoxy compounds, ethylene-urea compounds, ethylene-imine compounds, phenolic resin, etc. is used. Rubber latex-resorcin-formalin resin adhesives or rubber component-isocyanate compound adhesives, such as triphenylmethane-4,4,4-triisocyanate adhesive, are particularly preferred. Specific content of the fiber-philic component in any adhesive composition is determined in accordance with the materials of rubber cover and the fibers, while normally it is no more than 25 wt. percent to the rubber component, preferably no more than 15 wt. percent. The content is preferably kept to the allowable minimum, for improving the flexibility of conveyor belt. With the increase in the content of fiber-philic component, there is a tendency that less pickup of the adhesive composition by infiltration achieves satisfactory result.

With a conveyor belt of the invention, it is not always necessary to mix a fiber-philic component into the adhesive composition, due to the anchoring effect of its specific construction. In the known conveyor belts containing core body of woven sheets, if an adhesive composition containing no fiber-philic component is used for bonding rubber cover with the woven sheets, the peel strength is drastically reduced. Whereas, in the conveyor belt of the invention, even when an adhesive containing no fiber-philic component is used to bond the rubber over with core body by pressing, the peel strength of practical level is retained. Thus the conveyor belt of the invention exhibits practicable level of peel strength, when its filamentary layer and web layers are formed of polyester or polypropylene fibers and the nonwoven sheet is bonded with the rubber cover using an adhesive composed of rubber component only, in the absence of cheap and suitable adhesive component having affinity to such fibers.

However, in case an adhesive containing a fiber-philic component is used, the weight ratio of the component to the rubber component must be within the range specified in the above. Otherwise, the interfibrous fixing advances excessively as already mentioned, and the flexibility of the belt is remarkably impaired.

The adhesive can be used in the form of a solution in a solvent, such as hydrocarbon solvents including gasolin, hexane, and petroleum ether; benzene solvents including benzene, toluene and xylene; ketone solvents such as methyl ethyl ketone and diethyl ketone; or in rubber-latex form. When a fiber-philic component is added as one component of the adhesive, isocyanate compounds are preferred for organic solvent type adhesive compositions, and resorcin-formalin resins are preferred for latex type adhesive compositions. In case of dissolving rubber in organic solvent, it is preferred that the rubber should be fully masticated.

It is of course permissible to blend with the adhesive composition, various reinforcing agent, vulcanization agent, and additives, such as carbon black, sulfur, zinc flower, stearic acid, calcium carbonate, processing oil, etc., and/or various promotor and antioxidant, in accordance with the accepted practice.

Unnecessarily high viscosity of the adhesive solution should be avoided, since such will prevent uniform infiltration of the adhesive into the nonwoven sheet. Appropriate viscosity is dependent on thickness (weight) of the nonwoven sheet, but normally is not higher than 150 p.i.g., preferably not higher than 100 p.i.g. When the nonwoven sheet is relatively thick (800 g./m.$^2$ or above in weight), the viscosity of adhesive solution is necessarily not higher than 100 p.i.g.

The conveyor belt of the invention is manufactured, on the principle, in accordance with ordinary method. However, the manufacture of the conveyor belt of this invention is different from that of conventional conveyor belts in the following point.

In the manufacture of known conveyor belts, woven sheets are used as the core. Accordingly, the woven sheets must be subjected to a rubberizing step by friction in advance. In contrast, no rubberizing step is necessary in the process of this invention.

First the nontwisted and noncrimped filaments are wound on a bobbin mounted on a creel stand, and the filaments are withdrawn from the bobbin as flatly paralleled, towlike filament of several thousands to several tens of thousand deniers. On the top and bottom surfaces of thus paralleled filaments, then web layers are superposed, and the three sheets are together fed into a needle locker. Or, multiple strands of filamentary yarns may be once wound onto warpers, and wherefrom supplied to the needle locker.

At the needle locker, the flatly paralleled towlike filaments and web layers are subjected to needling, under a tension of at least 2 g. per 1,200 deniers of the filaments, preferably at least 5 g. In that case, the tension of maximum feasible is preferred, since higher tension reduces unevenness in tension distribution among the yarns in the filamentary layer. Thus a product of better uniformity can be obtained under the higher tension. When the tension is too low, fiber orientation is disturbed during the needling, and the longitudinal strength of the belt are impaired.

As aforesaid, it is permissible to perform the first or preneedling on the filamentary layer composed of flatly paralleled, towlike filaments and/or web layer or layers; and then to perform the second needling on the layers integrally superposed.

Thus needled nonwoven sheet composed of filamentary layer and web layers is then impregnated with an adhesive, to a point of sufficient pickup.

The sheet is then dried, and baked for 2-10 minutes at a temperature of 100-180° C., preferably 130-160° C., to be converted to the core body in accordance with the invention.

The core is then interposed between cover rubber, and passed for 10-30 minutes under a pressure of 10-40 kg./cm.$^2$, normally 20 kg./cm.$^2$ at a temperature of 120-180° C., preferably 140-150° C., to complete the conveyor belt of the invention.

In the above process of manufacture, the filaments constituting the filamentary layer, the webs forming the web layers, weight ratios between the two, needling conditions, size and configuration of needle, and adhesive composition, etc. are similar to those fully described as to the conveyor belt of the invention.

The conveyor belt of the invention thus possesses novel construction and excellent performance. That is, the core body of the belt must have the specific components and construction as follows:

1. A synthetic chemical filamentary layer in which nontwisted and noncrimped filaments form a layer as paralleled in longitudinal direction;
2. Two carded or random web layers of crimped staple fibers, which are superposed on the top and bottom of the filamentary layer;
3. Nonwoven sheet formed by the above three layers integrated by needling;
4. The core body formed by impregnating the nonwoven sheet with an adhesive.

The satisfactory numerical ranges and other limitative factors of the above composition are as described in the foregoing.

And, the criticality of each constituent of the conveyor belt of this invention can be summarized as follows:

The filamentary layer alone cannot form a dimensionally stable core body because the filaments have no intertwining property. Therefore any conveyor belt having the filamentary layer alone as the core body is impracticable.

Whereas, conveyor belts having web layers alone as the core body cannot satisfy the requirements on flexibility and longitudinal strength incurred on a conveyor belt. Satisfactory core body is formed by superposing two web layers on the two surfaces of the filamentary layer. If only one web layer is used, the resulting conveyor belt exhibits only unsatisfactory longitudinal strength, flexibility, and rubber peel strength. Also is the nonwoven sheet composed of a filamentary layer and two web layers is not impregnated with an adhesive, the conveyor belt using such a sheet as the core shows poor flexibility and rubber peel strength, and unsatisfactory for practical use.

Conveyor belts with the core meeting all the requirements of the invention except that it not needled, show markedly reduced longitudinal strength, flexibility and rubber peel strength, and unsatisfactory for practical use.

Furthermore, the advantages of the subject conveyor belt can be enumerated as follows:

1. While the conveyor belt with monoply, woven fabric as the core has a too great elongation and pliability for practical use, the belt of the invention has a small elongation and suitable hardness with the monoply core of specified structure.
2. Therefore, the belt of the invention is thinner and lighter in weight compared with the belt with a core of laminated, several layers of woven fabric. Consequently the former tends to be along the pulley, even when the pulley diameter is small.
3. While the strong adherability with rubber is an essential requirement for the conveyor belt using multi-ply woven fabrics as the core, the core body in accordance with the invention exhibits excellent adherability with rubber, because the core is monoply and has web layers as its constituent.
4. In case of conveyor belt with woven core, occasionally braker is used separately for protecting the woven core, particularly from impact, etc. Whereas, the filamentary layer in the core of the subject conveyor belt is sufficiently protected by the web layers.
5. In case of conveyor belts with woven core, the core is prepared from fibers through numbers of steps with much labor such as spinning, twisting, and weaving. Furthermore, the core is subjected to dipping of adhesive agent such as resorcin-formalin latex and rubber friction, and thereafter pressed with rubber cover.

Whereas, the conveyor belt of the invention can be manufactured by remarkably shortened steps such as forming the nonwoven sheet, treating the same with a rubber-type adhesive, and pressing it with rubber cover. Furthermore, the belt can be continuously manufactured in accordance with the present invention.

6. The object of the invention being to provide the conveyor belt with monoply core, however, multi-ply core as of ordinary woven core may also be formed if desired.

Hereinafter the invention will be explained with reference to working examples.

EXAMPLE 1

Nontwisted and noncrimped polyvinyl alcohol synthetic filaments of the size 1,200 dr./200f. (the strength-elongation of the yarn: 8.4 Kg.×13 percent) were paralleled over a width of 30 cm. at a ratio of 16 strands per 1 cm. (214 g./m.$^2$ by weight), and subjected to a needling of 50 times per square centimeter to impart intertwining property to the filaments. Then each 50 g./m.$^2$ of two webs of polyvinyl alcohol synthetic fiber (2 deniers in size and 51 mm. in fiber length; the strength-elongation of the single fiber: 5.5 g./dr.×14.5 percent) were superposed on the top and bottom of the filamentary layer, and subjected to a needling of 300 times per square centimeter. Thereafter the integrated sheet was impregnated with a resorcin-formalin latex (hereinafter abbreviated as RFL) as an adhesive agent. RFL was prepared as follows:

The molar ratio of R/F was 1:1; RF concentration was 6 percent, and 4 percent of caustic soda to the R was added. The adhesive composition was allowed to stand for 6 hours at an ambient temperature of 20° C., to age RF in the latex. To the resulting aqueous solution of RF resin, a latex was added at a weight ratio of 15/100. The latex was obtained by mixing styrene-butadiene copolymer latex, Nipol L × 102 with vinylpyridine-styrene-butadiene copolymer latex, Hycar 2518 F5 at a weight ratio of 3:1. Both of said two latices were products manufactured by Japanese Geon Company. After addition of the latex, the composition was allowed to stand for 16 hours at 20° C. to complete the aging. The adhered amount of the adhesive agent was 20.4 percent. The fabric was baked for 4 minutes at 160° C. The so obtained nonwoven fabric exhibited strength of 110 kg. per width of 1 cm. in the paralleling direction of the filaments. On both surfaces of the so obtained core body, cover rubber of the following composition was superposed and the entirety was pressed at 150° C. for 20 minutes.

Composition of the cover rubber was as follows.

| Component | Parts by weight |
| --- | --- |
| Natural rubber | 40 |
| Styrene-butadiene rubber | 60 |
| Carbon black | 50 |
| Zinc flower | 5 |
| Stearic acid | 2.8 |
| Sulfur | 2.2 |
| Promotor | 1 |
| Aging resistant agent | 1 |

The obtained conveyor belt was subjected to a flexing test by a Scott's flexing tester (manufactured by Uejima Seisakush of Japan), the belt withstood flexing of 500,000 times until causing separation, exhibiting strength-elongation of 14 Kg./cm.×16.2 percent and rubber peel strength of 20.2 kg./width of 25 cm.

The measurements of strength-elongation, flexibility and rubber peel strength were performed as follows:

Strength-elongation

A 3-cm. wide and 20-cm. long piece was cut off from the sample conveyor belt, and pulled at a Kg.×of 5 cm./min., with a clutching interval of 10 cm. Thus measured value, for example 225 Kg./cm.×16.5 percent of Run No. 1, denotes that strength per width of 1 cm. of the belt was 225 kg. and elongation of the belt at that time was 16.5 percent as compared with the original length. The strength-elongation was measured by a general tensile tester (manufacture by Shimazu Seisakusho of Japan, Autograph IS-2000).

Flexibility

The test was performed with Scott's flexing tester (manufactured by Uejima Seisakusho, Japan).

Test Specimen: 2.5 cm. in width and 35 cm. in length

The test piece was mounted on a grooved wheel of 25 cm. in diameter, and its two ends were fixed. The angle at the circumference at a contact point of the grooved wheel to the test piece was 135°. Then the piece was caused to perform repetitive, continuous bending along the circumference of the grooved wheel, at a reciprocation rate of 170 times per minute over a reciprocatory distance of 134 mm., under a load of 50 kg.

The number of flexing at which an abnormality was observed in the test specimen was recorded as the norm of flexing performance.

Rubber peel strength

Test Specimen: 2.5 cm. in width and 20 cm. in length

The rubber cover was peeled off from the core of the specimen by a short distance, and the tips of the two were interposed between clamps of a belt peel tester and pulled to each opposite direction at a rate of 5 cm./min. The tensile load under which the peeling distance reached 7.5 cm. was recorded by a recorder and the rubber peel strength was calculated therefrom. The measured values showed a wavy graph when plotted and arithmetic mean of each crest point of said wavy portion of the curve was calculated, which was made a peel strength.

The measuring was done using a belt peel tester (manufactured by Uejima Seisakusho, Japan).

EXAMPLE 2

Nontwisted and noncrimped polyvinyl alcohol synthetic filaments of the size 4,800 dr./800f. (the strength-elongation of the yarn: 32.5 Kg.×13 percent) were paralleled over a width of 30 cm. at a ratio of 10 strands per 1 cm. (534 g./m.$^2$ by weight), and subjected to a needling of 100 times per square centimeter. Then each 95 g./m.$^2$ of two webs of polyvinyl alcohol synthetic fiber (2 deniers in size and 51 mm. in fiber length; the strength-elongation of the single fiber: 5.5 g./dr.×14.5 percent) were superposed on the two surfaces of this filamentary layer, and the three layers were integrated by a needling of 550 times per square centimeter.

After needling, the resultant nonwoven sheet was impregnated with RFL whose composition was the same as that in example 1. The product showed a strength of 220 kg./1 cm. in the direction of filaments. Pressing rubber cover thereonto by the method same as that in example 1, the resulting conveyor belt was subjected to a peeling test. High bonding strength between the core and rubber cover was demonstrated by the peel strength of 21 kg./2.5 cm. in width. The monoply belt withstood the flexing of 200,000 times in the bending test. Thus the core was proven to have an excellent performance as the core of conveyor belt, and the belt showed strength of 220 kg. and elongation of 17.1 percent.

The strength-elongation, flexibility and rubber peel strength were measured in identical manner with those described in example 1.

EXAMPLE 3

Nontwisted and noncrimped Vinylon filaments of the size 4,800 dr./2,000f. (the strength-elongation of the yarn: 33.6 Kg.×14.1 percent) were paralleled at a ratio of 4 strands per the width of 1 cm. (214 g./m.$^2$ by weight), and subjected to a needling of 25 times per square centimeter.

Between two of the above filamentary layers, a Vinylon web of 50 g./m.$^2$ (2 dr.×51 mm.: the strength-elongation of the single fiber: 5.5 g./dr.×14.5 percent) was inserted, and further on the top and bottom of the sandwiching layers, same webs were superposed and subjected to needling. The punching density of the needling was 200 times per square centimeter. Subsequently the layers were bonded with an acrylate latex in the accepted manner. The adhesive pickup was 25 percent, and the resultant nonwoven fabric had a strength of 230 kg./cm. in the direction of filaments.

The strength-elongation was determined by the same method as described in example 1.

EXAMPLE 4

Nontwisted and noncrimped polyvinyl alcohol synthetic filaments of the size 1,200 dr./200f. (the strength-elongation of the yarn: 8.4 kg.×13 percent) were paralleled over a width of 30 cm., at a ratio of 32 strands per width of 1 cm. (427 g./m.$^2$ by weight), and in the meantime, the top and bottom surfaces of the layer were superposed with each one web of polyvinyl alcohol synthetic fibers (80 g./m.$^2$ in weight, 7 deniers in size, and 51 mm. in fiber length; the strength-elongation of the single fiber: 6.1 g./dr.×16.2 percent). The layers were subjected to a needling of 300 times per square centimeter, and then treated with a RFL adhesive as follows: The mol ratio of R/F was 1/1; RF concentration was 6 percent, and 4 percent of caustic soda to the R was added. The adhesive composition was allowed to stand for 6 hours at an ambient temperature of 20° C., to age RF in the latex. To the resulting aqueous solution of RF resin, a latex was added at a weight ratio of 15/300. The latex was that obtained by mixing styrene-butadiene copolymer latex, Nipol L × 102 and vinyl-pyridine-styrene-butadiene copolymer latex Hycar 2518 FS at a rate of 3:1. After addition of the latex, the composition was allowed to stand for 16 hours at 20° C. to complete the aging. Thus obtained RFL solution (viscosity: 5 poise) was sufficiently impregnated into the above nonwoven fabric. The fabric was baked for 4 minutes at 160° C. The RFL pickup of the nonwoven fabric was 25.7 percent.

Thus obtained nonwoven fabric was pressed at 20 kg./cm.$^2$ of press pressure for 20 minutes at 150° C., as interposed between rubber covers of 1.6 mm. in thickness.

The performance of thus obtained conveyor belt of the invention was as indicated in Table I as Run No. 1.

Separately, nontwisted and noncrimped filaments of polyvinyl alcohol synthetic fiber of the size 1,200 dr./200f. (the strength-elongation of the yarn: 8.4 Kg.×13 percent) were paralleled at the ratio of 32 strands per 1 cm. width (427 g./m.$^2$ by weight), and subjected to a preneedling at a punching density of 15 times per square centimeter on its both surfaces. Each 80 g./m.$^2$ of two webs formed of polyvinyl alcohol synthetic fiber (7 deniers in size and 51 mm. in fiber length; the strength-elongation of the single fiber: 6.1 g./dr.×16.2 percent) were superposed respectively on top and bottom of the filamentary layer, and together subjected to another needling at a punching density of 300 times per square centimeter. Thus formed nonwoven sheet was subsequently treated in the manner identical with the procedures described in the above. Performance of the conveyor belt thus obtained is given as Run No. 2 in Table I. As regards the flexibility, the symbol $o$ shows that the conveyor belt was not changed, and the symbol $x$ shows that separation occurred.

In the same Table, Run Nos. 3 though 17 and 20 through 22 are the controls, the conveyor belts being within the scope of this invention except in the point described in the second column.

The strength-elongation, flexibility and rubber peel strength were measured by the identical methods with those described in example 1, except that in the flexibility test, a grooved wheel of 35 mm. in diameter was employed.

As the covering, the rubber of following composition was employed.

| Component | Parts by weight |
| --- | --- |
| Natural rubber | 40 |
| Styrene-butadiene rubber | 60 |
| Carbon black | 50 |
| Zinc flower | 5 |
| Stearic acid | 2.8 |
| Sulfur | 2.2 |
| Promotor | 1 |
| Aging resistant agent | 1 |

TABLE I

| Run No. | Conveyor belt | Lengthwise strength-elongation (kg./cm. × percent) | Flexibility (thousand times) | Rubber peel strength |
| --- | --- | --- | --- | --- |
| 1 | Each single web was superposed on the top and bottom of filamentary layer and needled together. | 225×16.5 | 150 o | [1] 20.4/2.5 |
| 2 | The filamentary layer alone was needled in advance and then superposed with two webs and needled together. | 215×17.1 | 150 o | 20.4 |
| 3 | The core body was formed of webs alone. | 12.4×45.2 | 8 × | [1] 16.4/2.5 |
| 4 | Only one web was superposed on the filamentary layer. | 162×15.8 | 24 × | 14.3–20.4 |
| 5 | Twisted filaments were used to form the filamentary layer (100 T./m.). | 170×24.1 | 69 × | 20.4 |
| 6 | Crimped filaments were used to form the filamentary layer (22 crimps/2.54 cm.). | 63×31.5 | 150 o | 20.3 |
| 7 | Tension exerted on the filamentary layer was low (tension filament=1.2 g./l., 200 dr) | 86.5×26.2 | 150 o | 20.3 |
| 8 | The weight ratio of web layers to filamentary layer was more than 1:1 (500 g./m.$^2$:1/1.17; Belt thickness: 4.8 mm.; Core thickness: 1.6 mm.). | 265×17.9 | 42 × | 20.5 |
| 9 | The weight ratio of web layers to filamentary layer was less than 1:5 (60 g./m.$^2$: 1/7.1; Belt thickness: 4.0 mm.; Core thickness: 0.8 mm.). | 146×12.6 | 55 × | 16.2 |
| 10 | The filamentary layer was excessively heavy (Filamentary layer: 1050 g./m.$^2$; Web layers: 270 g./m.$^2$; Belt thickness: 4.8 mm.; Core thickness: 1.7 mm. | 531.4×17.4 | 35 × | 20.4 |
| 11 | Pre-needling of web layers was performed at a punching density of 90 times/cm.$^2$. | 209×15.8 | 63 × | 19.8 |
| 12 | The layers were joined by means of an adhesive alone, without needling. | 211×14.1 | 2 × | |
| 13 | Punching density of the needling was less than 100 times/cm.$^2$ (80 times/cm.$^2$). | 241×14.3 | 21 × | 20.4 |
| 14 | Punching density of the needling was more than 600 times/cm.$^2$ (720 times/cm.$^2$). | 130×30.3 | 150 o | 20.0 |
| 15 | No adhesive was used. | 101×10.4 | 34 × | 8.3 |
| 16 | Pick-up of the adhesive* was less than 20% (RFL 14%). | 177×16.9 | 82 × | 17.0 |
| 17 | In the adhesive composition*, the content of non-rubber component was greater than 25/100 (RF/L ratio: 30/100). | 231×15.4 | 54 × | 20.8 |
| 18 | No non-rubber component (fiber-philic component) was added to the adhesive composition (RF/L ratio: 0/100). | 219×19.1 | 150 o | 11.5 |
| 19 | Desmodur R (an isocyanate type compound, product of Farbenfabriken Bayer A.G.) was blended in the adhesive at a ratio of 12% to the rubber component (added to dissolved rubber). | 221×17.8 | 150 o | 18.3 |
| 20 | Desmodur R was blended in the adhesive at a ratio of 30% the rubber component (added to dissolved rubber). | 229×15.4 | 43 o | 19.2 |
| 21 | The viscosity of adhesive was too high to infiltrate into the non-woven fabric (dissolved rubber having a viscosity of 1750 p.i.g.). | 143×20.3 | 71 o | 8.4 |
| 22 | The combination of adhesive and the rubber composition of covering was unsuitable (covering was of neoplene type rubber). | 225×16.2 | 55 × | 6.3 |
| 23 | The viscosity of adhesive was low enough to be fully infiltrate the non-woven fabric (dissolved rubber having a viscosity of 7 p.i.g.). | 215×18.2 | 150 o | 11.2 |

[1] Kg./cm.
* As the adhesive, a composition identical with that of rubber cover was dissolved in gasoline-toluene solution (1:1) for rubber. In the case, only drying was carried out and no baking was carried out.

EXAMPLE 5

Conveyor belts were manufactured in the manner described in example 4, except that the synthetic fiber material of the filamentary layer and web layers was replaced by those indicated in Table II. Their longitudinal strength-elongation, flexibility and rubber peel strength are given also in Table II.

The measurement of the properties was performed by the testing methods identical with those described in example 4.

TABLE II

| Fiber material | Filamentary layer (dr./fil.) | Web layer (dr.×mm.) | Longitudinal strength-elongation (kg./cm.× percent) | Flexibility (thousand times) |
|---|---|---|---|---|
| Polyester | 1000/250 | 3×51 | 203×15.2 | 150 |
| Polyvinyl | 1200/200 | 7×51 | 225×16.5 | 150 |
| Polypropylene | 1000/250 | 3×51 | 215×18.6 | 150 |
| Polyamide | 840/160 | 3×51 | 248×23.2 | 150 |
| Tenacious rayon | 1650/1100 | 3×51 | 143×11.2 | 150 |

EXAMPLE 6

1. A conveyor belt within the scope of this invention was prepared in the manner described in example 4. The weight of the core body treated with RFL adhesive, after subsequent drying and baking, was 738 g./m.$^2$, and that of the conveyor belt bonded with the rubber cover by pressing was 4,580 g./m.$^2$. The belt was 4.2 mm. in thickness.

2. Separately, plain woven canvas of the structure $$\frac{1200 \text{ d}/3 \times 848 \text{ d}/2}{45 \text{ strands} \times 27 \text{ (5 cm. in width)}},$$

and of the weight 505 g./m.$^2$ was prepared from polyvinyl alcohol synthetic filaments 1,200 dr./200f. (the strength-elongation of the yarn: 8.4 kg.×13 percent) as the woof and nylon filaments 840 dr./160f. (the strength elongation of the yarn: 6.4 kg.×22.5 percent) as the warp, and using monopoly of the plain woven sheet as the core, a conveyor belt was prepared in the manner described in example 4. The resultant belt was 4,400 g./m.$^2$ in weight and 4.1 mm. in thickness.

3. Separately, a woven fabric of polyvinyl alcohol synthetic spun fiber (2 dr.×51 mm.: the strength-elongation of the single fiber 5.5 g./dr.×14.5 percent) of the structure $$\frac{10/4 \times 10/4}{45 \text{ strand} \times 25 \text{ strands (5 cm. in width)}}$$

and of the weight 450 g./m.$^2$ was treated with RFL adhesive in the manner described in example 4. Then rubber of the same composition as the cover rubber was rubbed in the woven sheet. Four sheets of this obtained woven fabric were laminated, and bonded with the rubber cover by pressing as described in example 4. Thus a conveyor belt with the core formed of four-ply woven sheet was manufactured, which had a weight of 6.680 g./m.$^2$, and a thickness of 6.0 mm.

4. A conveyor belt similar to that manufactured in the experiment 1 above was manufactured, except that its filamentary layer was replaced by the plain woven sheet employed in 2 above. The core formed of the plain woven sheet with two web layers superposed on its two surfaces had a weight of 856 g./m.$^2$ after RFL treatment. The belt had a weight of 4,700 g./m.$^2$ and a thickness of 4.3 mm.

As to the foregoing four conveyor belts, longitudinal strength-elongation, elongation under tension corresponding to one-tenth of belt strength, flexibility, metallic tool joining efficiency, rubber peel strength, impact strength and fatigue property were measured, with the results as given in Table III.

The longitudinal strength-elongation, flexibility and rubber peel strength were measured by the methods described in example 1. Other properties were measured as follows:

Elongation under tension corresponding to one-tenth of belt strength

It was measured in accordance with the same process of measuring longitudinal strength-elongation except tension corresponding to one-tenth of the belt strength was imposed on the belt. Normally, a conveyor belt is made to run while being imposed with tension corresponding to one-tenth to one-sixteenth. Therefore, said elongation under tension corresponding to one-tenth of belt strength becomes one important characteristics of the belt.

Metallic tool joining efficiency

The two 4.5-cm. wide and 15-cm. long samples conveyor belts were jointed with No. 27 lacing (the shape of the lacing was that defined in JIS B 1851), and the joint portion was broken by exertion of tension as in the strength-elongation test same as in example 1 except the distance between clamps was 20 cm. and the tensile speed was 10 cm./min. The ratio between the breaking strength and the strength of the sample belt was recorded as the metallic tool joining efficiency.

Impact strength

The sample was fixed at both ends, and subjected to a tension corresponding to one-twelfth of the strength of sample belt. To the sample then 9 kg.-m. per blow of impact energy was exerted with an iron piece having a 3-mm. long blade, totaling 500 blows. The strength of the belt measured before and after the impact was expressed by a percentile value.

Fatigue property

A 10-cm. wide and 4-m. long sample belt was caused to run between two pulleys of 30 cm. in diameter under the following conditions, and the strength variation before and after the running was expressed by a percentile value:

Belt tension: one-twelfth of belt strength
Running velocity: 1,200 m./min.
Running period: 2 months.

TABLE III

| | Longitudinal strength-elongation (kg./cm.× percent) | Elongation under tension corres. to 1/10 of belt strength (percent) | Flexibility (thousand times) | Metallic tool joining efficiency (percent) | Rubber peel strength kg./2.5 cm.) | Impact strength (percent) | Fatigue resistance (percent) |
|---|---|---|---|---|---|---|---|
| Conveyor belt of the invention | 225×16.5 | 0.4 | 500 o | 36 | 20.4 | 93.8 | 84.8 |
| Conveyor belt with monoply, woven core | 207×20.6 | 3.1 | 500 o | 34 | 15.4 | 38.3 | 89.1 |
| Conveyor belt with fourply, woven core | 221×20.1 | 1.0 | 280 × | 30 | 14.2 | 53.1 | 70.5 |
| Conveyor belt in which the filamentary layer was replaced by woven fabric | 223×21.5 | 3.3 | 350 × | 39 | 20.4 | 95.2 | 89.5 |

We claim:

1. A conveyor belt in which the rubber cover is bonded to a core impregnated with an adhesive, characterized in that the core is a nonwoven sheet consisting of a filamentary layer of longitudinally and flatly paralleled filaments selected from synthetic filaments and chemical filaments in the form of tows and web layers of staple fibers which are superposed on the top and bottom of the filamentary layer, said filamentary layer being composed of substantially nontwisted and noncrimped filaments with the web layers being composed of crimped staple fibers, said filamentary layer and the web layers being superposed and integrated by needling to produce entanglement between the filaments and fibers the nonwoven sheet being sufficiently impregnated with a rubber-type adhesive, the weight ratio of the filamentary layer to the web layers being within the range of 5:1 to 1:1.

2. The conveyor belt of claim 1, in which the fiber material forming the filamentary layer and web layers is selected from the group consisting of polyesters, polyvinyls, polypropylenes and high tenacity rayon.

3. The conveyor belt of claim 1, in which the filaments forming the filamentary layer are substantially continuous, the staple fibers forming the web layers are at least 40 mm. in length, and the size of both materials ranges from 1.45–7 denier.

4. The conveyor belt of claim 1, in which the filamentary layer is subjected to a preneedling of a punching density ranging from 15–200 times/cm.$^2$.

5. The conveyor belt of claim 1, in which the web layers are subjected to a preneedling at a punching density of no more than 30 times/cm.$^2$.

6. The conveyor belt of claim 1, in which the filamentary layer and web layers are subjected to a needling at a punching density of 100–600 times/cm.$^2$.

7. The conveyor belt of claim 1, in which the adhesive pickup of the core is at least 20 percent by weight.

8. The conveyor belt of claim 1, in which the adhesive is composed of at least one rubber component and at least one fiber-philic component selected from group consisting of an isocyanate compound, resorcin-formalin resin, epoxy compound, ethylene-urea compound, ethylene-imine compound and phenolic resin.

9. The conveyor belt of claim 8, in which the fiber-philic component in the adhesive is present in an amount of no more than 25 percent by weight based on the rubber component.

10. The conveyor belt of claim 1, in which the adhesive contains a solvent selected from the group consisting of hydrocarbon-type, benzene-type, and ketone-type solvents.

11. The conveyor belt of claim 1, in which the adhesive has a viscosity not higher than 150 p.i.g.

12. The conveyor belt of claim 1, wherein said web layers are composed of random staple fibers.

13. The conveyor belt of claim 1, wherein said web layers are composed of carded staple fibers.

* * * * *